(12) United States Patent
Receveur et al.

(10) Patent No.: US 8,429,778 B2
(45) Date of Patent: Apr. 30, 2013

(54) LOW NOISE LINEAR DIAPHRAGM COMPRESSOR BY VARIABLE AMPLITUDE DRIVER

(75) Inventors: Timothy J. Receveur, Guilford, IN (US); Joshua A. Williams, Harrison, OH (US); Bradley T. Wilson, Tyler, TX (US); Irvin J. Vanderpohl, Greensburg, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 13/083,794

(22) Filed: Apr. 11, 2011

(65) Prior Publication Data

US 2012/0255121 A1 Oct. 11, 2012

(51) Int. Cl.
*A47C 27/08* (2006.01)
*G05D 7/06* (2006.01)
*G06F 19/00* (2011.01)

(52) U.S. Cl.
USPC ............. 5/706; 5/655.3; 137/223; 137/224; 700/282

(58) Field of Classification Search ............. 5/706, 713, 5/644, 654, 655.3; 137/223, 224; 417/410.1; 700/282
See application file for complete search history.

(56) References Cited

U.S. PATENT DOCUMENTS

| | | | |
|---|---|---|---|
| 3,477,071 A | 11/1969 | Emerson | |
| 4,037,598 A | 7/1977 | Georgi | |
| 4,352,048 A | 9/1982 | Schulze | |
| 4,417,312 A | 11/1983 | Cronin | |
| 4,498,036 A | 2/1985 | Salemka | |
| 4,563,175 A | 1/1986 | LaFond | |
| 4,628,499 A | 12/1986 | Hammett | |
| 4,975,628 A | 12/1990 | Lemieux | |
| 4,980,793 A | 12/1990 | Glowczewski et al. | |
| 5,032,772 A | 7/1991 | Fully | |
| 5,079,785 A * | 1/1992 | Garcia | 5/654 |
| 5,106,268 A | 4/1992 | Kawamura | |
| 5,637,076 A * | 6/1997 | Hazard et al. | 601/5 |
| 5,652,484 A | 7/1997 | Shafer et al. | |
| 5,719,451 A | 2/1998 | Cook | |
| 5,809,157 A | 9/1998 | Grumazescu | |
| 5,833,440 A | 11/1998 | Berling | |
| 5,903,941 A | 5/1999 | Shafer et al. | |
| 5,924,975 A | 7/1999 | Goldowsky | |
| 6,014,784 A | 1/2000 | Taylor et al. | |
| 6,202,672 B1 | 3/2001 | Ellis et al. | |
| 7,038,419 B1 | 5/2006 | Beale et al. | |
| 7,398,803 B2 | 7/2008 | Newton | |

(Continued)

FOREIGN PATENT DOCUMENTS

WO 2006/116859 A1 11/2006

OTHER PUBLICATIONS

European search report from related EP 12 16 2183 dated Sep. 25, 2012, 7 pages.

*Primary Examiner* — Robert G Santos
(74) *Attorney, Agent, or Firm* — Barnes & Thornburg LLP

(57) ABSTRACT

A patient-support apparatus includes an inflatable support structure, a variable output pump, a power supply and a controller. The pump includes a driver that is responsive to variations in the power signal applied to the driver to vary the output from the pump. The pump output is varied depending on the amount of flow needed as determined by a sensor that senses the pressure in the inflatable support structure.

5 Claims, 13 Drawing Sheets

U.S. PATENT DOCUMENTS

| | | | |
|---|---|---|---|
| 7,685,658 B2* | 3/2010 | Lokhorst et al. | 5/424 |
| 8,162,009 B2* | 4/2012 | Chaffee | 141/10 |
| 8,260,475 B2* | 9/2012 | Receveur | 700/301 |
| 8,302,222 B2* | 11/2012 | Jasani | 5/81.1 R |
| 2007/0158945 A1 | 7/2007 | Annen et al. | |
| 2007/0227594 A1* | 10/2007 | Chaffee | 137/224 |
| 2008/0005843 A1* | 1/2008 | Lokhorst et al. | 5/655.3 |
| 2009/0314354 A1* | 12/2009 | Chaffee | 137/14 |
| 2011/0113560 A1* | 5/2011 | Receveur | 5/706 |
| 2011/0167559 A1* | 7/2011 | Jasani | 5/81.1 R |
| 2012/0255121 A1* | 10/2012 | Receveur et al. | 5/600 |
| 2012/0330467 A1* | 12/2012 | Receveur | 700/282 |

* cited by examiner

LOW NOISE LINEAR DIAPHRAGM COMPRESSOR BY VARIABLE AMPLITUDE DRIVER

BACKGROUND

The present disclosure is related to patient support apparatuses that include inflatable support structures. More specifically, the present disclosure is related to patient support apparatuses including control structures for controlling the rate of inflation of an inflatable support structure.

Patient support apparatuses such as beds, and more particularly hospital beds, are known to include one or more inflatable support structure(s) for supporting at least a portion of patient on the inflatable structure. The pressure in the inflatable structure may be varied to change the interface pressure exerted on the skin of the patient supported on the inflatable structure. In some cases, the volume of an inflatable structure is substantial, even while the operating pressures are relatively low. The source of pressurized air used to inflate the support structure may have a sufficient rate of displacement to fill the volume of the structure in only a few minutes. Once filled, the volume of air required to maintain the inflatable structure at the appropriate pressure is significantly lower than that required to initially inflate the structure.

The competing requirements of low flow during normal operating conditions and high flow for the initial fill of the inflatable structure presents a trade-off. A high flow pressurized air source provides for a timely initial fill but has excess capacity during the low fill operation. A low flow pressurized air source on the other hand, may fail to provide sufficient flow to provide a timely initial fill. Furthermore, conventional high flow pressurized air sources are often noisier and cause more unwanted vibrations than low flow pressurized air sources.

SUMMARY

The present application discloses one or more of the features recited in the appended claims and/or the following features which alone or in any combination, may comprise patentable subject matter.

According to one aspect of the present disclosure, a patient-support apparatus may include an inflatable support structure; a variable output pump, a power supply and a controller. The variable output pump may be in fluid communication with the inflatable support structure. The variable output pump may include an alternating current driver configured to vary the flow of fluid from the variable output pump to the inflatable support structure. The power supply may be configured to provide an alternating current drive signal to the alternating current driver. The controller may be coupled to the power supply and the alternating current driver. The controller may be configured to vary an amplitude of the alternating current drive signal provided to the alternating current driver based on an operating mode of the inflatable support structure.

In some embodiments, the controller may include a sensor that is in fluid communication with the inflatable support structure, the sensor operable to detect a pressure in the inflatable support structure and provide an electrical signal indicative of the pressure in the inflatable support structure. The controller may include a drive circuit to vary the amplitude of the alternating current drive signal.

The drive circuit may include a first circuit portion configured to clip a first number of volts from each positive peak of the alternating current drive signal. The drive circuit may also include a second circuit portion configured to clip a second number of volts from each negative peak of the alternating current drive signal. The first circuit portion may include a first linear voltage regulator and a first resistive element configured to variably clip the first number of volts from each positive peak of the alternating current drive signal. The second circuit portion may include a second linear voltage regulator and a second resistive element configured to variably clip the second number of volts from each negative peak of the alternating current drive signal.

The controller may be configured to variably adjust a resistance for each of the first and second resistive elements to vary the first and second number of volts clipped from each of the positive and negative peaks of the alternating current drive signal. The first resistive element may be a first potentiometer and the second resistive element may be a second potentiometer. The controller may variably adjust the resistance of each of the first and second potentiometers based on the detected operating mode of the inflatable-support structure.

The drive circuit may be configured to variably adjust a duty cycle of the alternating current drive signal. The drive circuit may include a first circuit portion configured to variably adjust the duty cycle of a positive portion of the alternating current drive signal. The drive circuit may include a second circuit portion configured to variably adjust a negative portion of the alternating current drive signal. The first circuit portion may include a first transistor and a first diode configured to variably adjust the duty cycle of the positive portion of the alternating current drive signal. The second circuit portion may include a second transistor and a second diode configured to variably adjust the duty cycle of the negative portion of the alternating current drive signal. The first diode and the second diode may disperse at least a portion of energy from the alternating current drive signal.

According to another aspect of the present disclosure, a patient support apparatus may include an inflatable support structure; a variable output pump in fluid communication with the inflatable support structure, an amplifier, a power supply and a controller. The variable output pump may include an alternating current driver configured to vary the flow of fluid provided to the inflatable support structure by the variable output pump. The amplifier may be configured to amplify a sinusoidal waveform. The amplifier may be configured to apply an amount of gain to amplify the sinusoidal waveform. The amplifier may be configured to provide the amplified sinusoidal waveform to the alternating current driver. The power supply may be configured provide a direct current power signal to the amplifier and the amplifier may be configured to amplify the sinusoidal waveform with the DC power signal. The controller may be coupled to the power supply and the alternating current driver. The controller may be configured to variably adjust the amount of gain applied by the amplifier.

The amplifier may be configured to apply the amount of gain to vary an amplitude of the sinusoidal waveform. The amplifier may be configured to apply a maximum amount of gain possible to amplify the amplitude of the sinusoidal waveform. The amplifier may be configured to apply a reduced amount of gain to amplify the amplitude of the sinusoidal waveform, and wherein the reduced amount of gain is configured to be less than a maximum amount of gain possible. The controller may include a potentiometer to variably adjust the reduced amount of gain.

The controller may further include a sensor that is in fluid communication with the inflatable support structure, the sensor operable to detect a pressure in the inflatable support structure and provide an electrical signal indicative of the pressure in the inflatable support structure. The controller may adjust the reduced amount of gain based on the detected pressure in the inflatable-support structure.

According to yet another aspect of the present disclosure, a patient support apparatus includes an inflatable support structure; a variable output pump in fluid communication with the inflatable support structure, a drive circuit, a power supply, and a processor. The variable output pump may include an alternating current driver configured to vary the flow of fluid provided to the inflatable support structure by the variable output pump. The drive circuit may be configured to provide a direct current power signal to the alternating current driver. The drive circuit may alternate a current flow of the direct current power signal prior to providing the direct current power signal to the alternating current driver. The power supply may be configured to provide a direct current power signal to the drive circuit. The processor may be coupled to the power supply and the drive circuit, wherein the processor is configured to control the current flow provided by the drive circuit.

The processor may be further configured to control an amount of voltage provided by the direct current power supply.

The patient support apparatus may further include a sensor that is in fluid communication with the inflatable support structure. The sensor may be operable to detect a pressure in the inflatable support structure. The sensor may provide an electrical signal indicative of the pressure in the inflatable support structure. The processor may control the amount of voltage provided by the power supply in response to the pressure signal.

The drive circuit may include a first pair of transistors configured to provide the direct current power signal to the alternating current driver in a first direction of current flow. The drive circuit may also include a second pair of transistors configured to provide the direct current power to the alternating current driver in a second direction of current flow. The processor may provide a control signal to the first pair of transistors to enable current flow in the first direction. The processor may provide the control signal to the second pair of transistors to enable current flow in the second direction.

Additional features and advantages of the invention will become apparent to those skilled in the art upon consideration of the following detailed description of illustrated embodiments exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
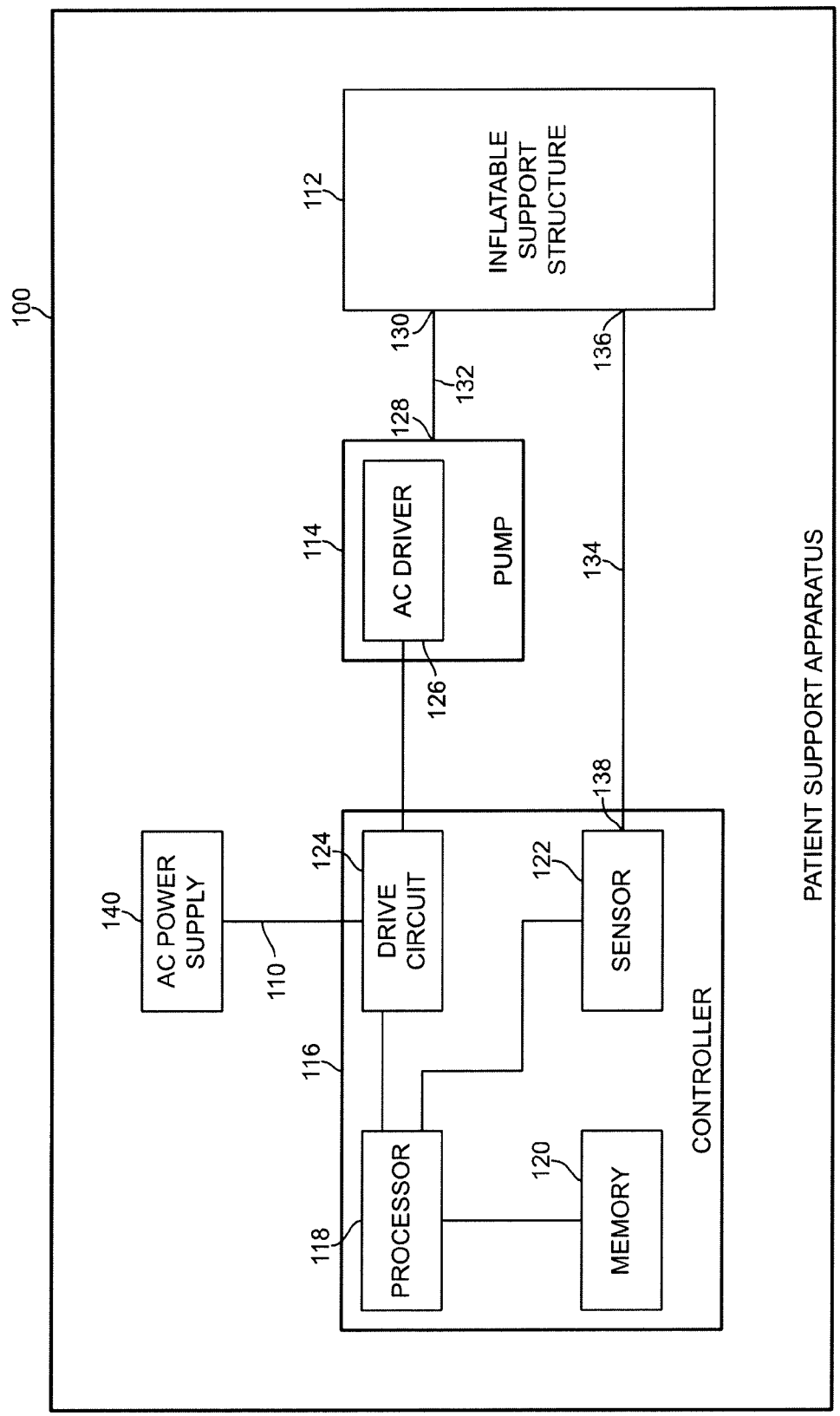
FIG. 1 is a diagrammatic representation of an embodiment of a patient support apparatus including an inflatable support structure for supporting at least a portion of a patient positioned on the patient support apparatus.

A patient support apparatus, such as a hospital bed 100, for example, is shown in FIG. 1. The hospital bed 100 includes an inflatable support structure 112, inflated by a variable output pump 114, and a controller 116 that controls operation of the pump 114 to inflate the structure 112. Illustratively, the inflatable support structure 112 is embodied as an air bladder positioned in a mattress. While the illustrative embodiment shows a single structure 112, it should be understood that in some embodiments multiple inflatable support structures 112 may be fed by a single pump 114. It should also be understood that a valve or manifold structure may be positioned between the pump 114 and structure 112 to open and close a flow path between the pump 114 and structure 112. For example, a valve may be used to prevent back flow from the structure 112 through the pump 114 when the pump 114 is not operating.

The pump 114 communicates pressurized air to the structure 112 through a conduit 132 from an outlet 128 of the pump 114 to an inlet 130 of the structure 112. In the illustrative embodiment, the pump 114 is a variable displacement diaphragm pump with an alternating current (AC) driver 126, embodied as a linear motor, which drives the diaphragm to compress air communicated through the conduit 132. The AC driver 126 is in communication with a drive circuit 124 of the controller 116 with the drive circuit 124 providing power for the operation of the driver 126. The AC driver 126 can be operated at different drive rates to change the displacement of the diaphragm as the pump 114 oscillates. For example, the drive circuit 124 provides an AC drive signal to the driver 126 to vary the drive rate of the pump 114. Each oscillation displaces a volume of air which is dependent on the distance of movement, also called displacement, of the diaphragm. The controller 116 is operable to control the displacement of the diaphragm by controlling the range of movement of the AC driver 126. As will be discussed below, the drive rate is maintained by controlling an amplitude of the AC drive signal provided to the AC driver 126 based on a mode of operation of the inflatable support structure 112. Various embodiments of variable output pumps may be utilized within the scope of this disclosure. Variable speed, variable displacement, variable volume, and variable flow are just a few of the terms used to describe a variable output pump. Any pump that may be controlled to vary the pressure and or flow from the pump may be used within the scope of this disclosure. As used herein, the term drive rate designates a variable operational characteristic of a pump including a rate of speed, displacement, output, or flow. The term pump may describe various structures such as compressors, blowers, or other apparatuses that are capable of moving a fluid.

The controller 116 includes a sensor 122, such as a pressure sensor, that provides a signal indicative of the pressure of the fluid in the inflatable support structure to a processor 118. In the embodiment shown in FIG. 1, the pressure sensor 122 is in fluid communication with the inflatable support structure 112 by a conduit 134, which is connected to the sensor 122 at an inlet 138 and to the inflatable support structure at an outlet 136. A memory device 120 is included in the controller 116 to store information and instructions to be used by the processor 118. The controller 116 further includes a drive circuit 124 which provides an AC drive signal to the driver 126 to cause the driver 126 to operate.

It is to be understood that various other embodiments of the sensor 122 may be utilized within the scope of this disclosure to provide a signal to the processor 118. For example, the sensor 122 shown in FIG. 1 may be a flow meter that provides the processor 118 with a signal indicative of the volumetric flow of the fluid from the pump 114. It is contemplated that any sensor appropriate for measuring a characteristic associated with the pressure of the fluid in the inflatable structure may be utilized within the scope of this disclosure.

Figure 2:
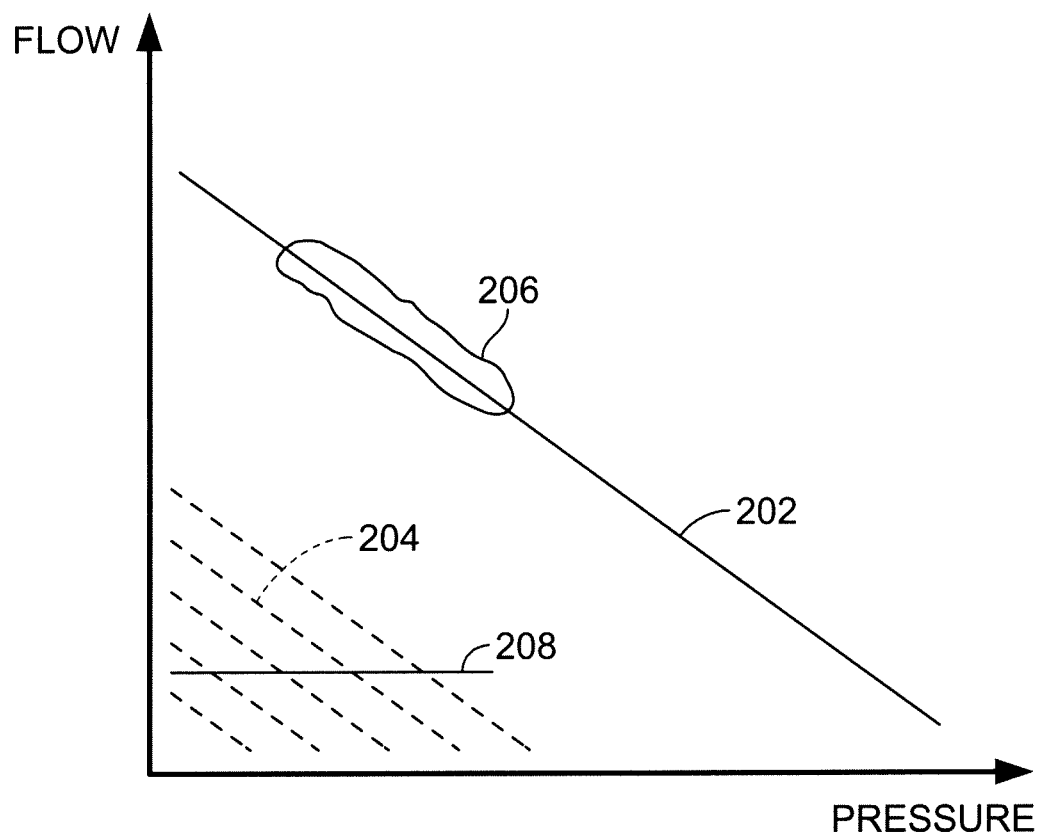
FIG. 2 is a graph of the relationship of pressure and flow as a function of the rate of displacement of a pump.

Referring to FIG. 2, a graph of the relationship of pressure and flow at the outlet of pump 114 is generalized. The line 202 represents a generalized response curve of the rate of flow from the pump 114 as a function of the pressure resisting the flow. The line 202 represents the operation of the pump 114 when driver 126 is operated at a maximum drive rate, thereby producing the maximum displacement of the diaphragm. The region 206 is the typical operating region for pump that has a single output condition. Because there is need for significant flow to fill a bladder, the pump must be oversized to provide sufficient flow. However, the capacity of the pump is excessive as the bladder is only required to operate in the pressures shown in the region 206.

As shown in FIG. 2, the flow from pump 114 decreases as the pressure increases. The flow is dependent, at least in part, on the magnitude of the pressure gradient between the outlet 128 of the pump 114 and the structure 112. Once the pressure gradient reaches approximately zero, such as when the pressure in the structure 112 reaches the maximum operating pressure of the pump 114, there will be no flow between the pump 114 and structure 112. This condition, referred to as "dead head" results in excessive noise from the pump 114. Additionally, maximum displacement of the diaphragm causes the diaphragm to reach mechanical limits, increasing the noise that emanates from the pump 114.

Utilizing a low-flow pressure response algorithm, the illustrative variable output pump 114 may be operated at various drive rates as represented by the lines 204. By varying the drive rate, the flow from the pump can be maintained at a substantially continuous rate as represented by the line 208. Operating the pump 114 to maintain continuous flow of line 208 reduces the energy required and heat generated by the pump 114 as well as reducing the noise emitted by the pump. A suitable low-flow pressure response algorithm is disclosed in U.S. patent application Ser. No. 12/622,283 filed Nov. 19, 2009 and entitled "CONSTANT LOW-FLOW AIR SOURCE CONTROL SYSTEM AND METHOD," the entirety of which is incorporated herein by reference.

Figure 3:
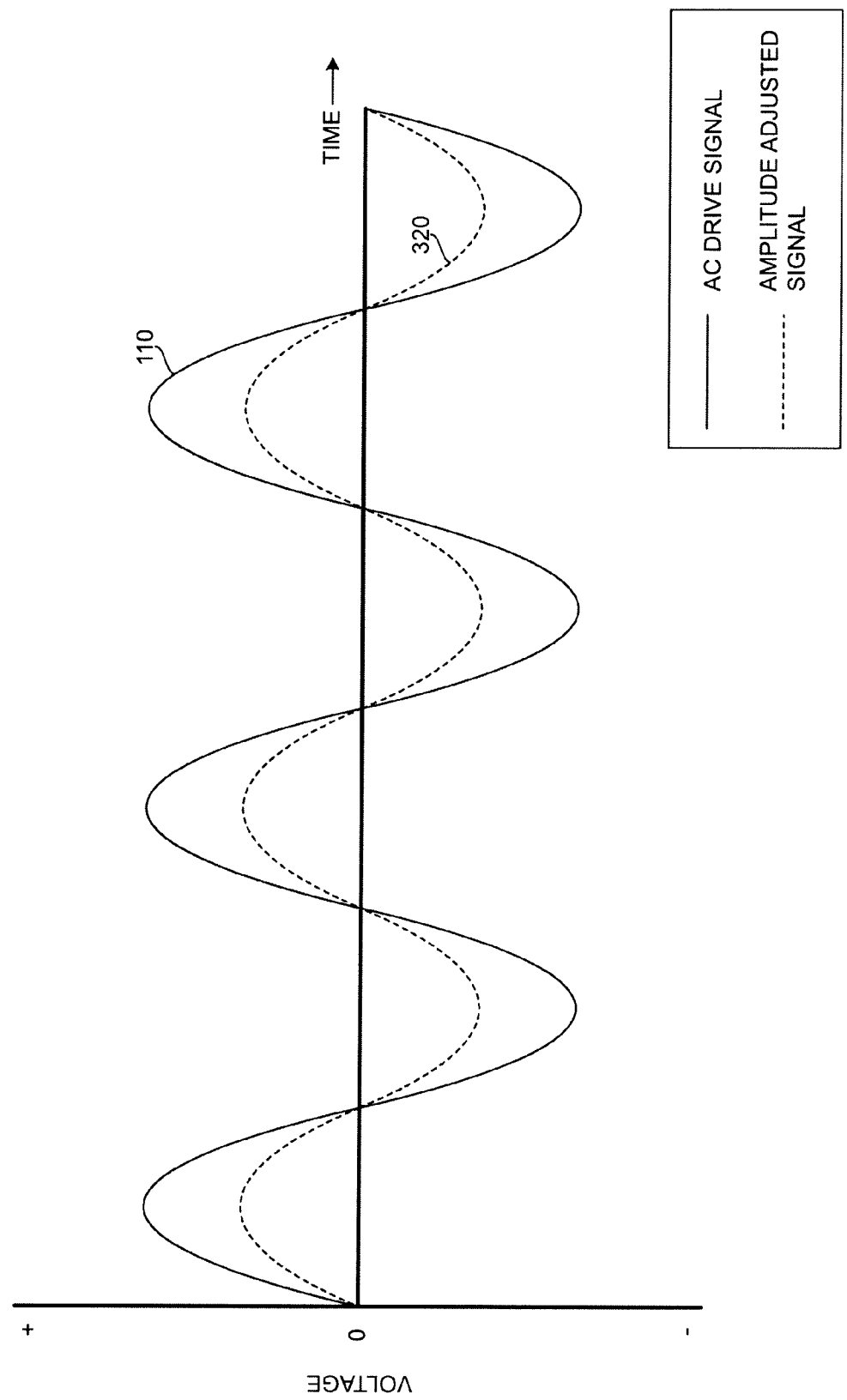
FIG. 3 is a graph of amplitudes for an AC drive signal both prior and subsequent to amplitude adjustment by a controller.

The drive circuit 124 varies the amplitude of an AC drive signal provided by an AC power supply 140 to the driver 126. By varying the amplitude of the AC drive signal, the drive circuit 124 controls the drive rate of the pump 114. As shown illustratively in FIGS. 1 and 3, the drive circuit 124 receives a raw AC drive signal 110 and adjusts the amplitude of the raw signal 110 based on an operating mode of the inflatable support structure 112. For example, the AC drive circuit 124 reduces the amplitude of the raw AC drive signal 110, and provides the amplitude adjusted AC drive signal 320 to the driver 126. The driver 126 operates the pump 114 at a lower drive rate based on the amplitude adjusted AC drive signal 320 having a reduced amplitude relative to the raw drive signal 110. In one illustrative embodiment, the drive circuit reduces the amplitude of a raw AC drive signal 110 to operate a pump 114 at a lower drive rate to minimize noise and vibration emanating from the pump 114.

Figure 4:
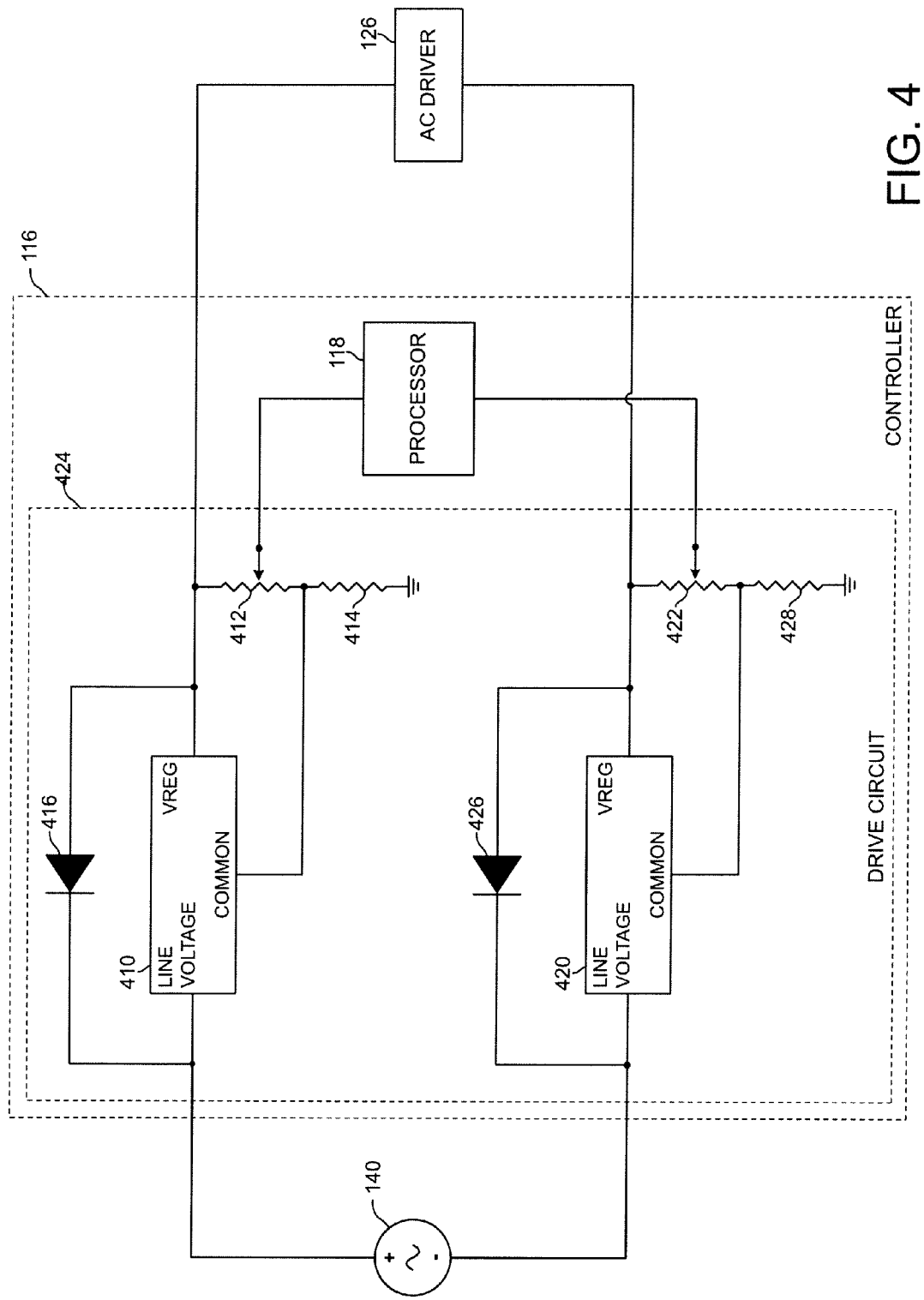
FIG. 4 is a diagrammatic representation of an embodiment of a circuit for adjusting amplitude of an AC drive signal, the circuit including one or more linear voltage regulators and potentiometers.
Figure 5:
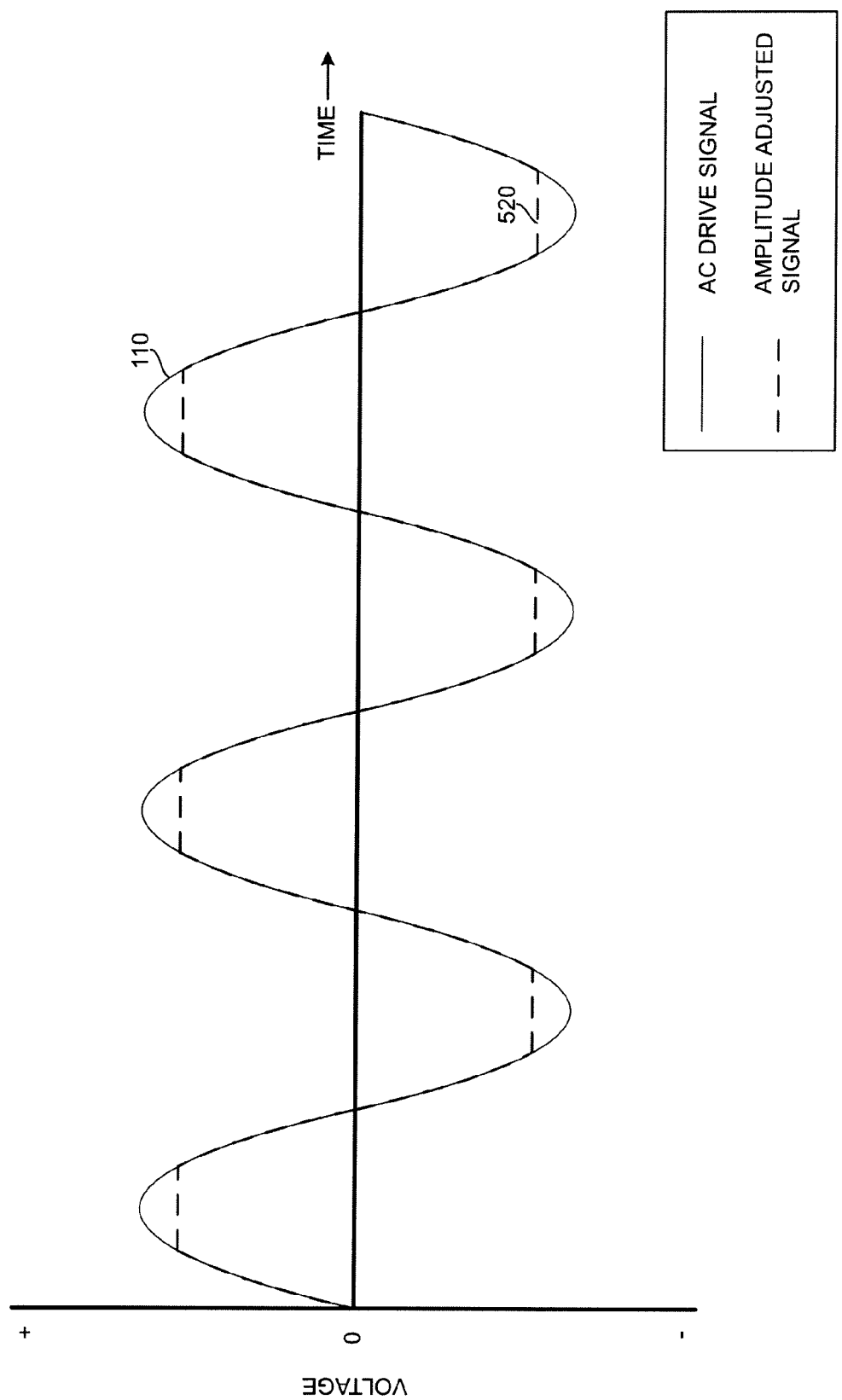
FIG. 5 is a graph of an embodiment of adjusted amplitude of an AC drive signal subsequent to amplitude adjustment by the drive circuit including one or more linear voltage regulators and potentiometers.

In one illustrative embodiment shown in FIG. 4, the controller 116 includes an AC drive circuit 424. The AC drive circuit 424 is similar to the drive circuit 124 shown in FIG. 1. Like the drive circuit 124, the AC drive circuit 424 is in communication with the AC driver 126 and adjusts a characteristic of the raw AC drive signal 110 provided by the AC power supply 140 to vary the drive rate of the pump 114. As shown in FIG. 4, the AC drive circuit 424 includes two voltage regulators 410, 420, two potentiometers 412, 422, two resistors 414, 428, and two diodes 416, 426 that cooperate to adjust the amplitude of the raw AC drive signal 110 provided to the driver 126. In this embodiment, the AC drive circuit 424 clips an amount of voltage from a top portion and bottom portion of the raw AC drive signal 110. As shown in FIG. 5, the AC drive circuit clips an amount of voltage from each positive-peak and negative-peak of the raw AC drive signal 110, which is in the form of a sinusoidal waveform having repeating positive and negative peaks. After clipping the amount of voltage from each positive-peak and negative peak of the raw AC drive signal 110, the AC drive circuit 424 provides an adjusted AC drive signal 520 to the driver 126. As illustrated in FIG. 5, the adjusted AC drive signal 520 has a reduced amplitude relative to the amplitude of the raw AC drive signal 110.

As will be understood by one of skill in the art, other quantities and/or combinations of voltage regulators, resistors, potentiometers, and diodes may be utilized within the scope of this disclosure to adjust a characteristic of the raw AC drive signal 110. For example, in some embodiments, one voltage regulator 410, one potentiometer 412, one resistor 414, one diode 416, and any other appropriate circuitry may be used clip an amount of voltage from the positive and negative peaks of the raw AC drive signal 110. In addition, various embodiments of the voltage regulators 410, 420, potentiometers 412, 422, diodes 416, 426, and resistors 414, 428 may be utilized within the scope of this disclosure. For example, voltage limiters, voltage conditioners, or any other circuitry appropriate for clipping an amplitude of an AC drive signal may be utilized as a substitute to the voltage regulators 410, 420. It is also contemplated that any circuitry appropriate for providing resistance or variable resistance may be utilized as a substitute for the potentiometers 412, 422 and resistors 414, 428.

Figure 6:
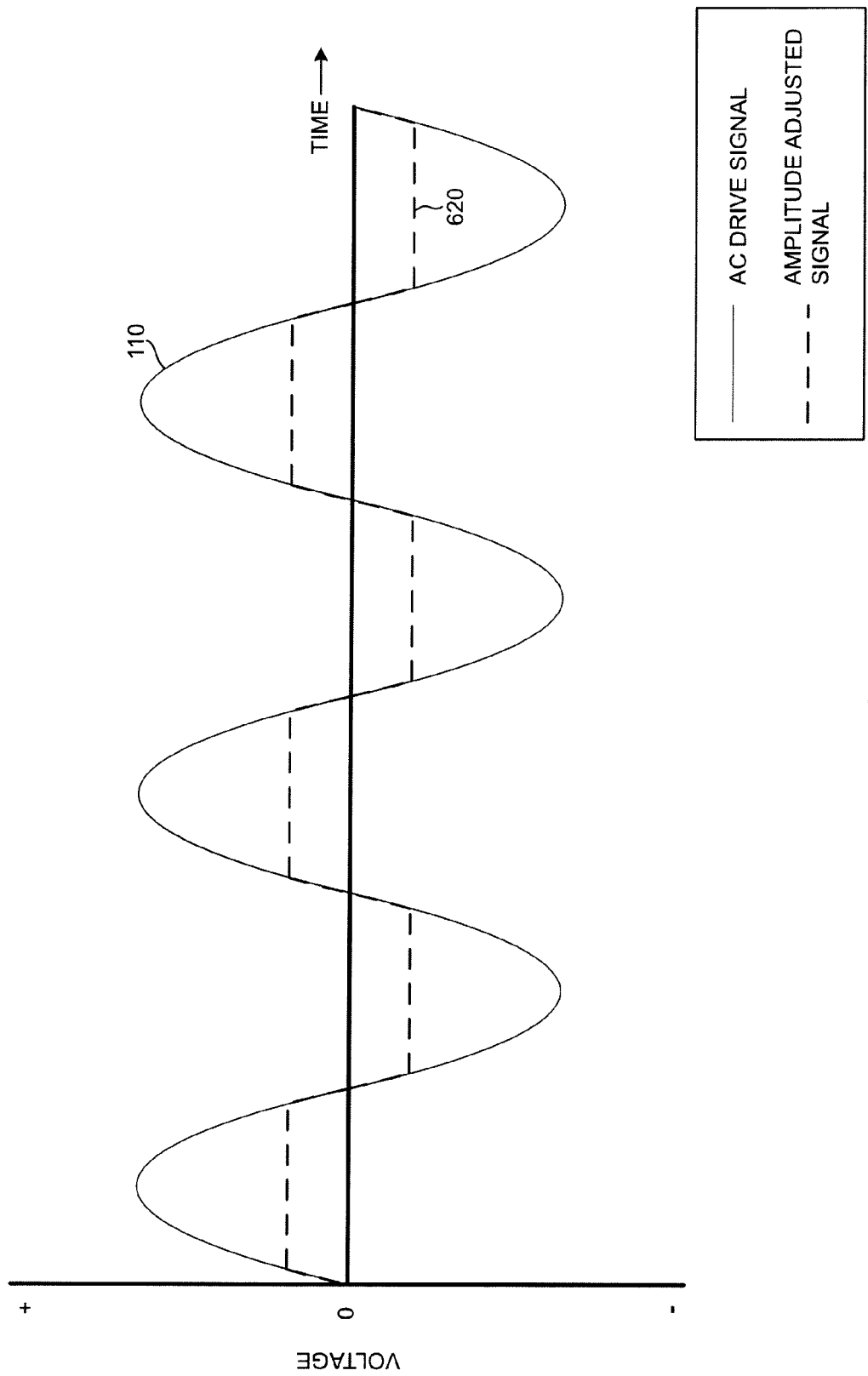
FIG. 6 is a graph of another embodiment of adjusted amplitude of an AC drive signal subsequent to amplitude adjustment by a drive circuit including one or more linear voltage regulators and potentiometers.

Referring back to the embodiment shown in FIG. 4, the potentiometers 412, 422 in cooperation with the resistors 414, 428 are utilized to adjust the amount of voltage clipped from each of the positive and negative peaks of the raw AC drive signal 110. For instance, the resistance of the potentiometers 412, 422 and/or the resistors 414, 428 may be variably adjusted to increase or decrease the amount of voltage clipped from the positive and negative peaks of the raw AC drive signal 110. As illustratively shown in FIGS. 5 and 6, less positive-peak and negative-peak voltage is required to be clipped from the raw AC drive signal 110 in order to produce the adjusted AC drive signal 520 than the amount of positive-peak and negative-peak voltage required to be clipped to produce the adjusted AC drive signal 620.

It is to be understood that various embodiments of the potentiometers may be utilized within the scope of this disclosure. For example, the potentiometers 412, 422 shown in FIG. 4 may be analog potentiometers, digital potentiometers, or any other structure appropriate for variably controlling an amount of resistance. It is contemplated that any appropriate technique for controlling the resistance of the potentiometers 412, 422 may be utilized within the scope of this disclosure.

In one embodiment, the controller 116 shown in FIG. 1 includes the AC drive circuit 424 of FIG. 4, the processor 118, the memory 120, and the sensor 122. The memory 120 stores information and instructions to be used by the processor 118. For instance, in some embodiments the memory 120 stores information received by the sensor 122 and a plurality of instructions, which when executed by the processor, determine an optimal drive rate for the pump 114 and an amount of voltage to be clipped from the positive and negative peaks of raw AC drive signal 110 to achieve the determined optimal drive rate. For instance, in some embodiments, the processor 118 uses a signal indicative of the pressure of the fluid in the inflatable structure 112 to determine whether the drive rate of the pump 114 needs to be adjusted. If a drive rate adjustment is necessary, the processor 118 adjusts the resistance of the potentiometers 412, 422 to a resistance level appropriate for clipping or trimming an appropriate amount of voltage from the positive and negative peaks of a raw AC drive signal 110.

Figure 7:
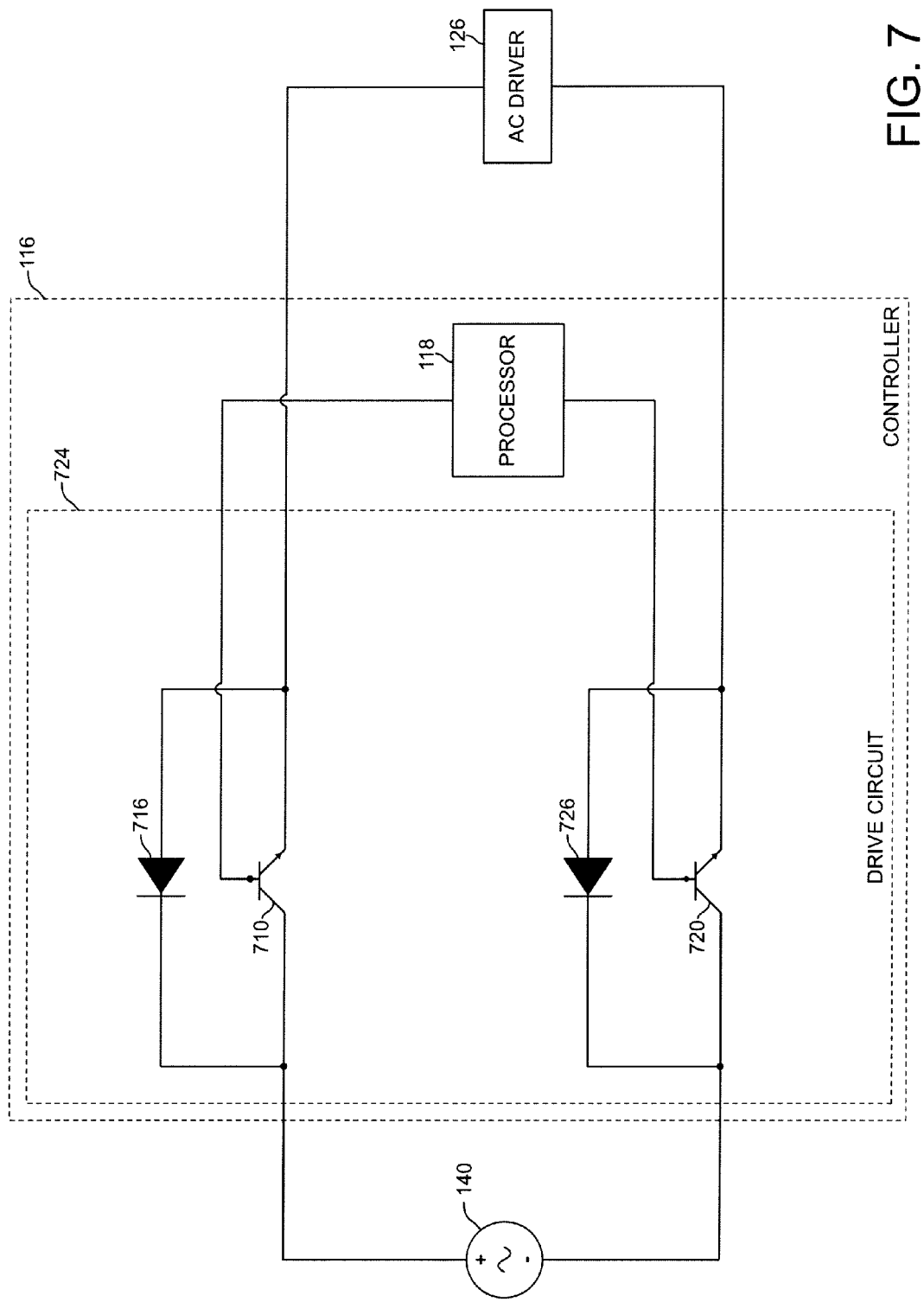
FIG. 7 is a diagrammatic representation of a drive circuit for adjusting the duty cycle of an AC drive signal, the drive circuit including two transistors.

In another embodiment, a controller 116, such as the one shown in FIG. 1, is operable to control the displacement of the diaphragm by controlling the range of movement of the AC driver 126. In this embodiment, the controller 116 maintains the drive rate by controlling the duty cycle of the AC drive signal provided to the AC driver 126 based on a mode of operation of the inflatable support structure 112. In this embodiment, the controller 116 includes a processor 118, a memory 120, a sensor 122, and a drive circuit 124. Illustratively, the drive circuit 124 may be the drive circuit 724 shown in FIG. 7. Like the drive circuit 124 of FIG. 1, the AC drive circuit 724 is in communication with the AC driver 126 and adjusts a characteristic of the raw AC drive signal 110 provided by the AC power supply 140 to vary the drive rate of the pump 114. In this embodiment, the AC drive circuit 724 controls a duty cycle of the raw AC drive signal 110 provided to the AC driver 126. As shown in FIG. 7, the AC drive circuit 724 includes two transistors 710, 720 and two diodes 716, 726. The transistors 710, 720 and the diodes 716, 726 cooperate to vary the duty cycle of a raw AC drive signal 110.

As will be understood by one of skill in the art, other quantities and/or combinations of transistors and diodes may be utilized within the scope of this disclosure to vary the duty cycle of the raw AC drive signal 110. For example, in some embodiments, one transistor 710, one diode 716, and any other appropriate circuitry may be used vary the duty cycle of the raw AC drive signal 110.

Figure 8:
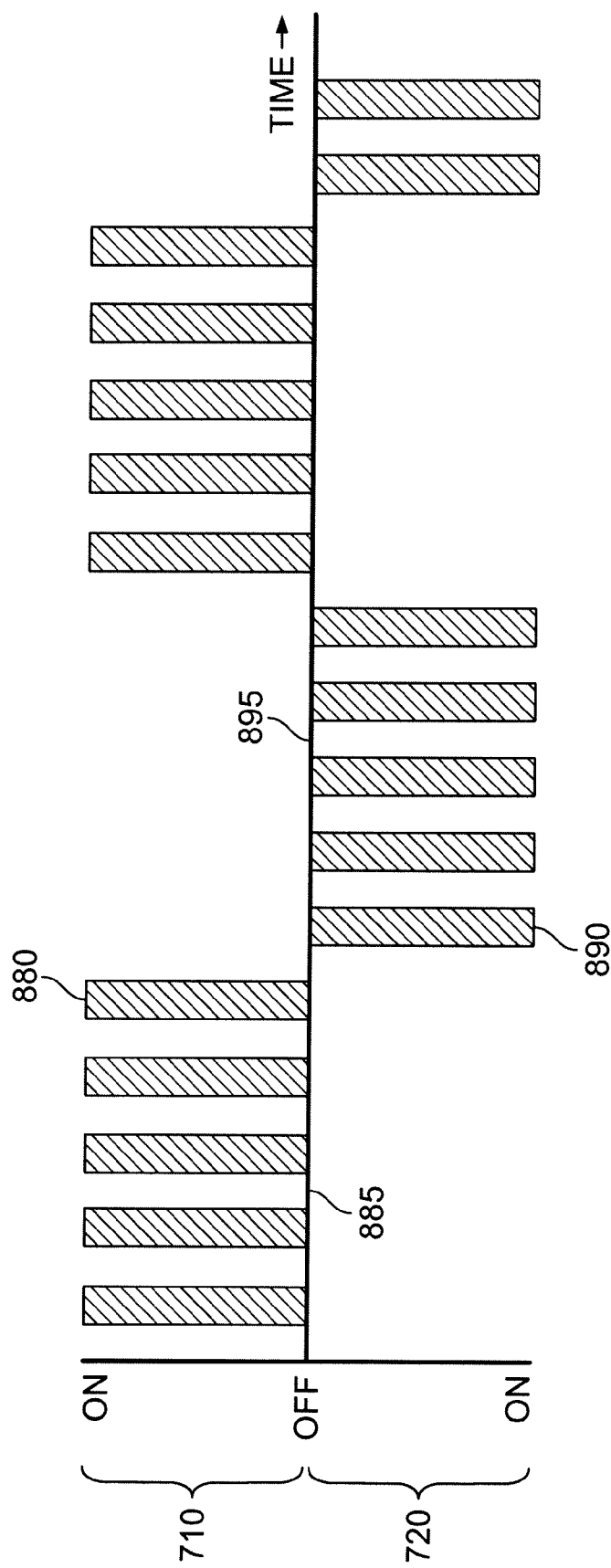
FIG. 8 is a graph of an on/off sequence of the two transistors of FIG. 7.

Referring back to the embodiment shown in FIG. 7, the transistors 710, 720 are utilized in cooperation with diodes 716, 726 to vary the duty cycle of the raw AC drive signal 110. For instance, in some embodiments, the transistors 710, 720 are utilized as switches having an "on" and "off" state. As will be understood by one of skill in the art, the "on" and "off" transistor states relate to whether the transistors 710, 720 act as "open" or "closed" circuits. In these embodiments, the transistors 710, 720 are individually turned "on" or "off" according to a variable pattern. As shown in FIG. 8, a first transistor 710 may be switched "on" 880 and "off" 885 according to the variable pattern. In a similar fashion, a second transistor 720 may also be switched "on" 890 and "off" 895 according to the variable pattern. Because of switching the transistors 710, 720 "on" and "off" according to the variable pattern, the duty cycle of the raw AC drive signal 110 is controlled.

Figure 9:
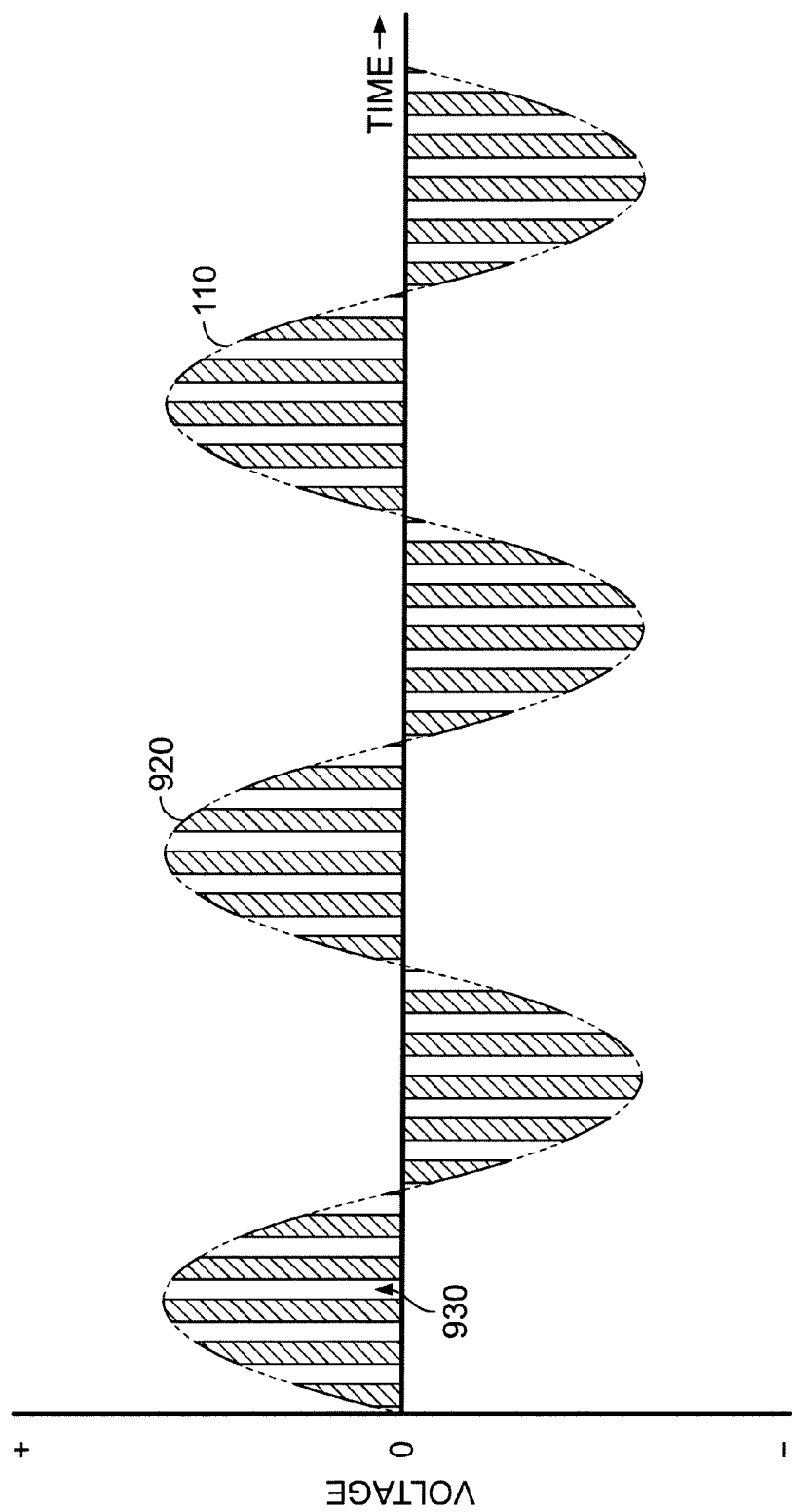
FIG. 9 is a graph of an AC drive signal subsequent to a duty cycle adjustment by the drive circuit of FIG. 7.

As illustratively shown in FIG. 9, the duty cycle of a raw AC drive signal 110 is controlled with the transistors 710, 720 and diodes 716, 726 of the drive circuit 724. The first transistor 710 is utilized in the "on" state 920, the drive circuit 724 provides a positive drive signal to the AC driver 126. And, during periods of time in which the first transistor 710 is utilized in the "off" state 930, the drive circuit 724 does not provide the drive signal to the AC driver 126. It should be understood the second transistor 720 may be utilized in a similar manner to provide a negative drive signal to the AC driver 126.

It is to be understood that various embodiments of the transistors 710, 720 may be utilized within the scope of this disclosure. For example, any suitable structure for switching "on" or "off" the flow of current may be utilized. For example, electrical switches, mechanical switches, or any other appropriate circuitry maybe utilized within the scope of this disclosure.

In another embodiment, the controller 116 shown in FIG. 1 includes the processor 118, the memory 120, the sensor 122, and the AC drive circuit 724 of FIG. 7. The memory 120 stores information and instructions to be used by the processor 118. For instance, in some embodiments the memory 120 stores information received by the sensor 122 and a plurality of instructions, which when executed by the processor, determine an optimal drive rate for the pump 114 and a variable "on/off" pattern to be utilized with the transistors 710, 720 to control the duty cycle of the raw AC drive signal 110 and achieve the determined optimal drive rate. For instance, in some embodiments, the processor 118 uses a signal indicative of the pressure of the fluid in the inflatable structure 112 to determine whether the drive rate of the pump 114 needs to be adjusted. If a drive rate adjustment is necessary, the processor 118 determines a variable "on/off" pattern to control the "on" and "off" states of the transistors 710, 720. Based on the variable "on/off" pattern, the processor 116 may send one or more control signals to the transistors 710, 720 to turn "on" or "off" the flow of current. As a result, the controller 116 controls the duty cycle and, therefore, the drive rate of the AC driver 126 with the processor 118.

Figure 10:
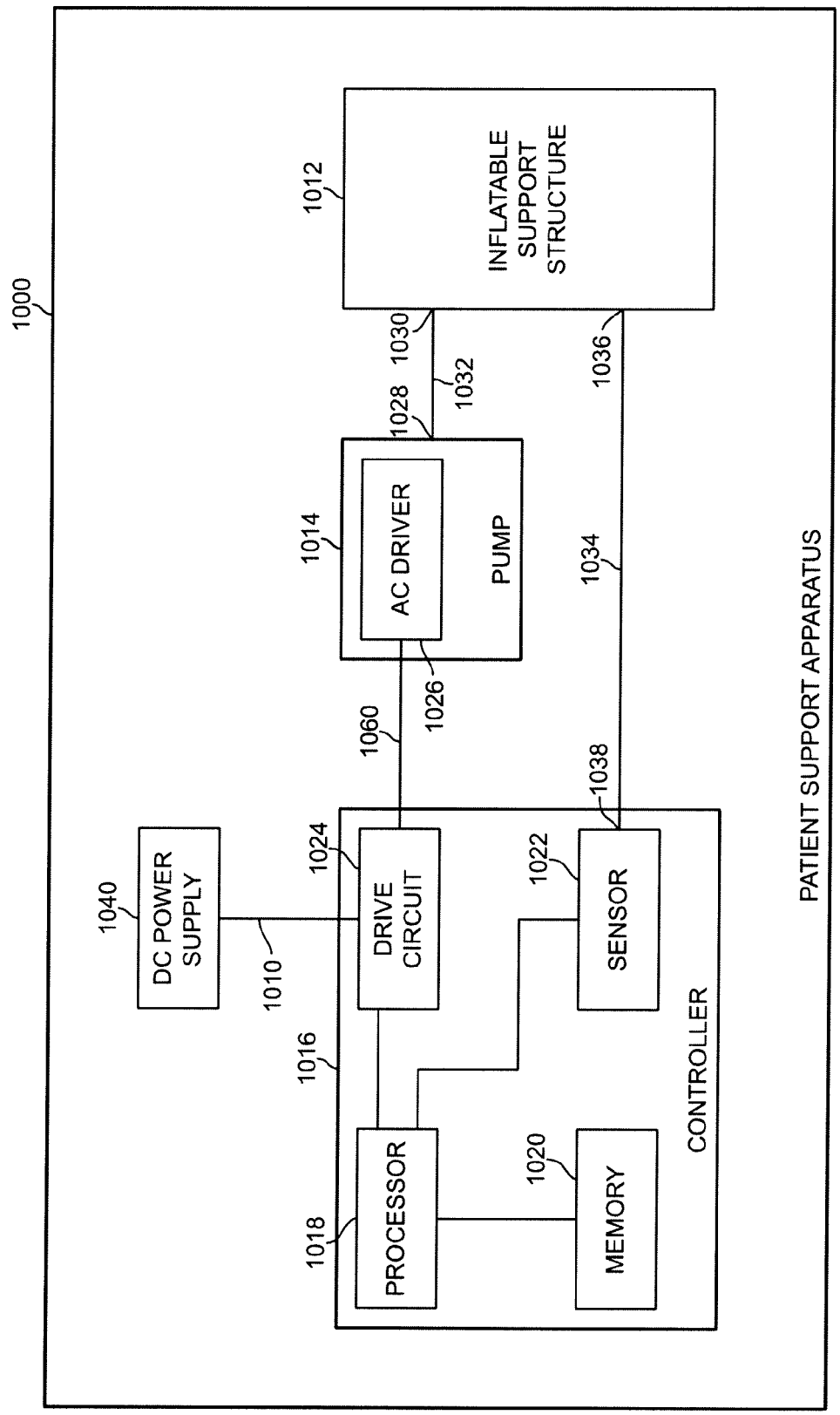
FIG. 10 is a diagrammatic representation of another embodiment of a patient support apparatus including an inflatable support structure for supporting at least a portion of a patient positioned on the patient support apparatus.

In another illustrative embodiment, a patient support apparatus 1000, such as a hospital bed, for example is shown in FIG. 10, includes a an inflatable support structure 1012, inflated by a variable output pump 1014, and a controller 1016 that controls operation of the pump 1014 to inflate the structure 1012. The inflatable support structure 1012 and variable output pump 1014 are similar in structure and functionality to the inflatable support structure 1012 and pump 114 shown in FIG. 1. It should be understood that as illustratively shown in FIG. 10, a valve or manifold structure may be positioned between the pump 1014 and structure 1012 to open and close a flow path between the pump 1014 and structure 1012. For example, a valve may be used to prevent back flow from the structure 1012 through the pump 1014 when the pump 1014 is not operating.

The pump 1014 communicates pressurized air to the structure 1012 through a conduit 1032 from an outlet 1028 of the pump 1014 to an inlet 1030 of the structure 1012. In the illustrative embodiment, the pump 1014 is a variable displacement diaphragm pump with an AC driver 1026 which drives the diaphragm to compress air communicated through the conduit 1032. In the illustrative embodiment, the AC driver 1026 is a linear motor. The AC driver 1026 is in communication with a drive circuit 1024 of the controller 1016 with the drive circuit 1024 providing power for the operation of the driver 1026.

In the illustrative embodiment shown in FIG. 10, the drive circuit 1024 receives a direct current (DC) power signal 1010 from a DC power supply 1040. In some embodiments, the DC power supply 1040 is in electrical communication with an AC mains supply (not shown). In those embodiments, the DC power supply 1040 receives an AC power signal from the AC mains supply and converts the AC power signal into the DC power signal 1010. It should be understood that any suitable structure for converting an AC power signal to a DC power signal are within the scope of this disclosure. For example, one of ordinary skill would understand that a transformer or other circuitry may be utilized to convert an AC power signal to a DC power signal.

The controller 1016 includes a pressure sensor 1022 that provides a signal indicative of the pressure of the fluid in the inflatable structure 1012 to a processor 1018. In the embodiment shown in FIG. 10, the pressure sensor 1022 is in fluid communication with the inflatable support structure 1012 by a conduit 1034, which is connected to the sensor 1022 at an inlet 1038 and to the inflatable support structure at an outlet 1036. A memory device 1020 is included in the controller 1016 to store information and instructions to be used by the processor 1018. In one embodiment, the memory device 1020 includes instructions to determine an optimal drive rate based on a suitable low-flow pressure algorithm similar to the one utilized in the patient support apparatus 100 of FIG. 1. When executed by the processor 1018 shown in FIG. 10, instructions stored in a non-transitory storage medium, such as the memory device 1020, cause the processor 1018 to receive the signal indicative of the pressure of the fluid in the inflatable structure 1012 from the sensor 1022. Utilizing the suitable low-flow pressure algorithm, the processor 1018 determines an optimal drive rate for the pump 1014. Based on the optimal drive rate, the drive circuit 1024 adjusts the amplitude of a drive signal and provides the amplitude adjusted drive signal 1060 to the driver 1026 for variable operation of the pump 1014.

It is to be understood that various embodiments of the sensor 1022 may be utilized within the scope of this disclosure to provide a signal to the processor 1018. For example, the sensor 1022 shown in FIG. 10 may be a flow meter that provides the processor 1018 with a signal indicative of the volumetric flow of the fluid from the pump 1014. It is contemplated that any sensor appropriate for measuring a characteristic associated with the pressure of the fluid in the inflatable structure may be utilized within the scope of this disclosure.

Figure 11:
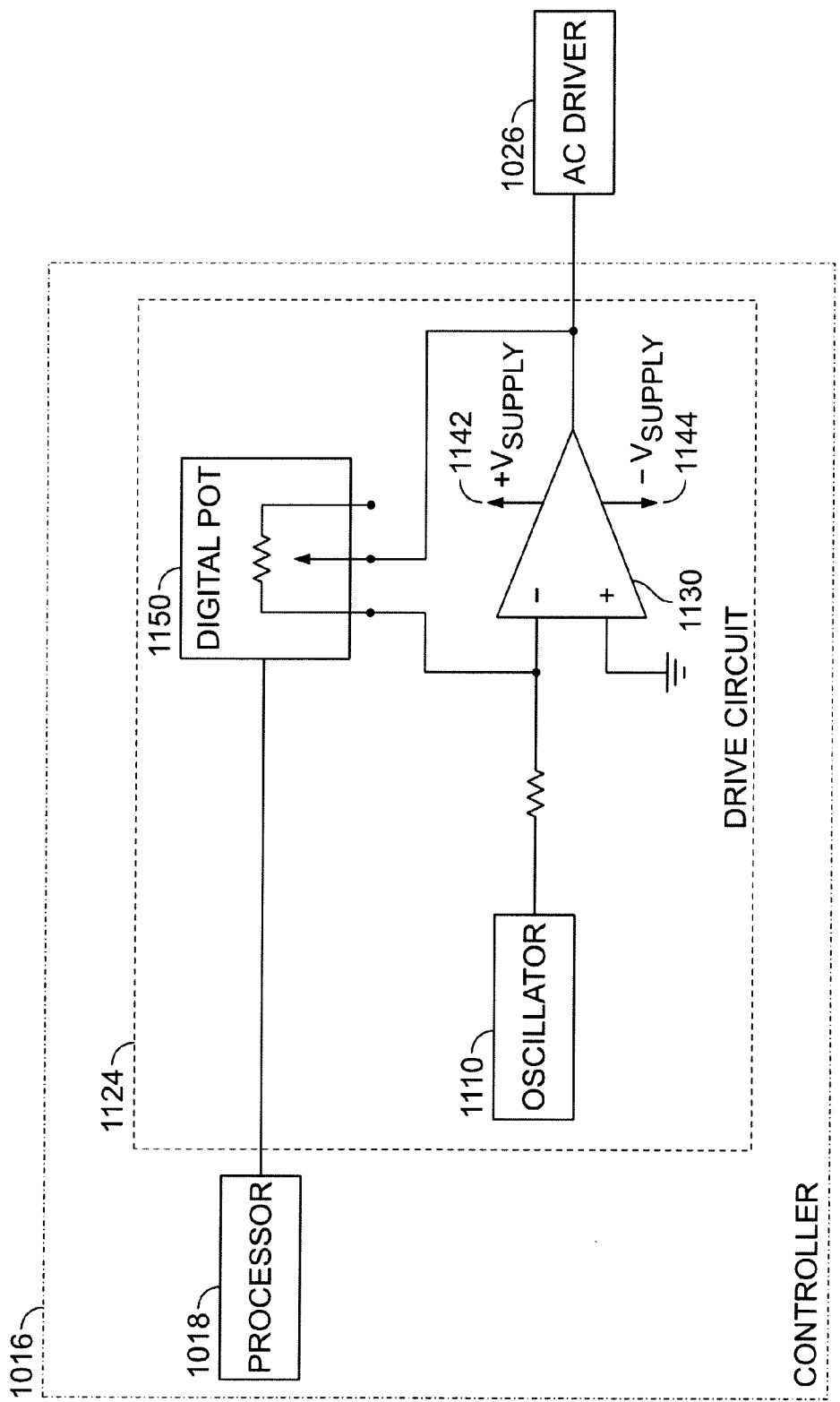
FIG. 11 is a diagrammatic representation of another embodiment of a drive circuit a potentiometer, the drive circuit including an amplifier, an oscillator, and for adjusting an amplitude of a drive signal provided to an AC driver.

In an embodiment shown in FIG. 11, the controller 1016 includes a drive circuit 1124. The drive circuit 1124 is similar to the drive circuit 1024 shown in FIG. 10. Like the drive circuit 1024, the drive circuit 1124 is in communication with the AC driver 1026 and provides an amplitude adjusted drive signal 1060 to the AC driver 1026 to vary the drive rate of the pump 1014. As shown in FIG. 11, the drive circuit 1124 includes an oscillator 1110 in electrical communication with a power amplifier 1130. The oscillator 1110 generates a low-amp sinusoidal waveform and provides the low-amp sinusoidal waveform to the power amplifier 1130 for amplification. The power amplifier 1130 is an inverting power amplifier in electrical communication with the AC driver 1026. The inverting power amplifier 1130 amplifies and inverts the low-amp sinusoidal waveform generated by the oscillator 1110.

In one embodiment, the inverting power amplifier 1130 of the drive circuit 1124 is in electrical communication with the DC power supply 1040 shown in FIG. 10. The DC power supply 1040 provides a positive DC voltage to a positive voltage supply 1142 of the inverting power amplifier 1130 shown in FIG. 11. In some embodiments, the DC power supply 1040 also provides a negative DC voltage to a negative voltage supply 1144 of the inverting power amplifier 1130. It is to be understood that any suitable structure for supplying a positive or negative DC voltage to power amplifier 1130 is within the scope of this disclosure. For example, a dual DC power supply may be utilized to provide both the positive and negative DC voltages to the power amplifier 1130. In other embodiments, two DC power supplies may be utilized, each DC power supply providing either the positive DC voltage or the negative DC voltage.

Illustratively, the drive circuit 1124 includes a potentiometer 1150 to variably adjust the amount of gain applied to the low-amp sinusoidal waveform by the inverting power amplifier 1130. By varying the amount of resistance of the potentiometer 1150, the amount of gain applied by the inverting power amplifier 1130 is adjusted. As a result, the amplitude of the low-amp sinusoidal waveform is also variably adjusted. For instance, in some embodiments, the potentiometer 1150 is utilized to reduce the amount of gain applied to the low-amp sinusoidal waveform relative to a maximum possible amount of gain. In those embodiments, the potentiometer 1150 may be utilized to first adjust the amount of gain applied to the low-amp sinusoidal waveform to a maximum level. Thereafter, the potentiometer 1150 may then be utilized to reduce the amount of gain applied to the low-amp sinusoidal waveform based on a determination of an optimal drive rate for operation of the pump 1014. In another embodiment, the potentiometer 1150 may be utilized to first adjust the amount of gain applied to the low-amp sinusoidal waveform to a minimum level of gain. In this embodiment, the potentiometer 1150 may then be utilized to increase the amount of gain applied to the low-amp sinusoidal waveform based on the determination of the optimal drive rate for operation of the pump 1014.

It is to be understood that various embodiments of the potentiometer 1150 may be utilized within the scope of this disclosure. For example, the potentiometer 1150 shown in FIG. 11 may be an analog potentiometer, a digital potentiometer, or any other structure appropriate for variably controlling an amount of resistance. It is contemplated that any appropriate technique for controlling the resistance of the potentiometer 1150 may be utilized within the scope of this disclosure. For example, resistance of the potentiometer 1150 may be adjusted using any appropriate mechanical and/or electrical technique.

The controller 1016 shown in FIG. 10 includes the processor 1018, the memory 1020, the sensor 1022, and the drive circuit 1124 of FIG. 11. Instructions stored in the memory 1020 are utilized by the processor 1018 to determine an optimal drive rate for operation of the pump 1014. If a drive rate adjustment is necessary, the processor 1018 instructs the potentiometer 1150 to adjust the resistance of the potentiometer 1150 to a resistance level appropriate for increasing or decreasing the gain applied to the low-amp sinusoidal waveform.

Figure 12:
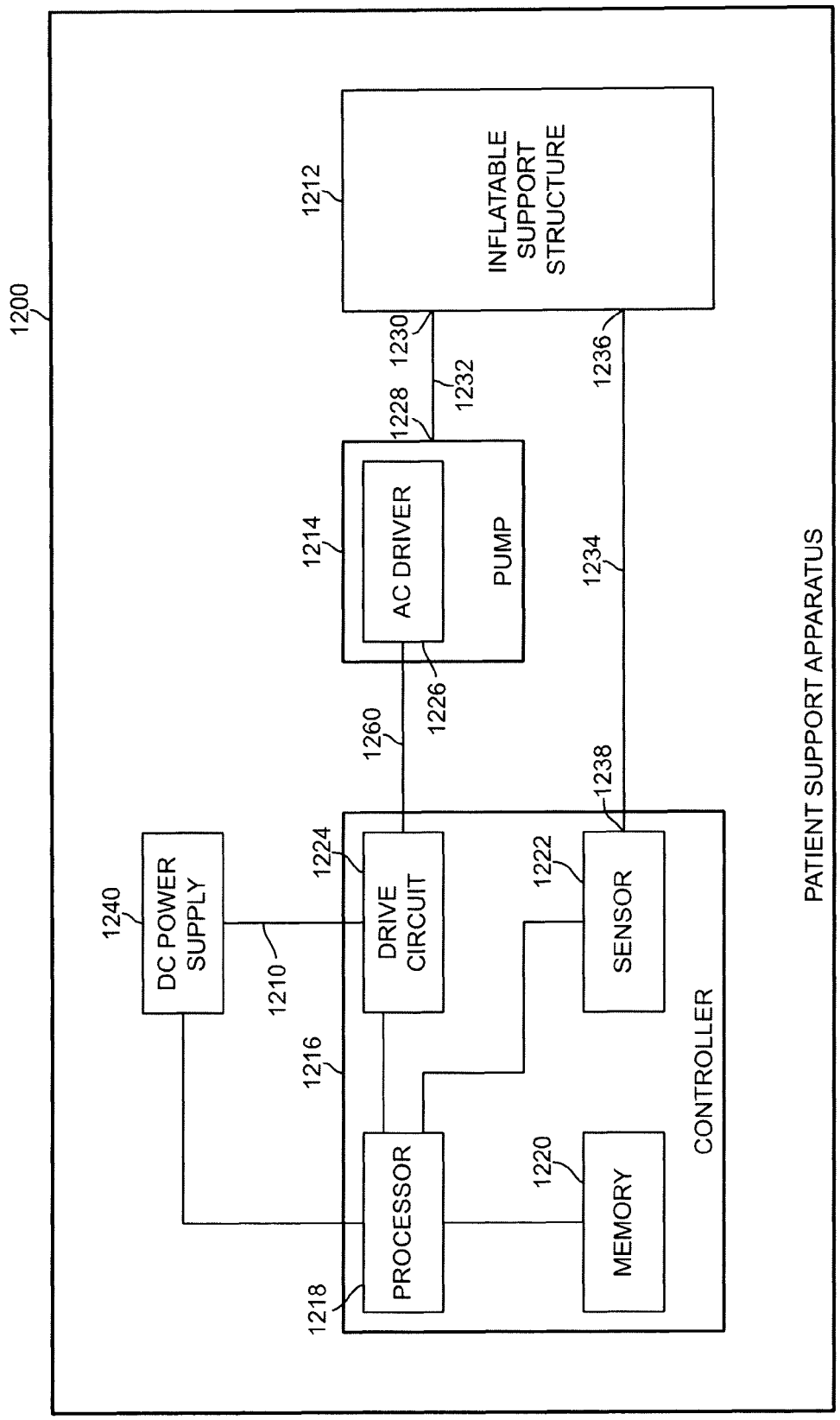
FIG. 12 is a diagrammatic representation of another embodiment of a patient support apparatus including an inflatable support structure for supporting at least a portion of a patient positioned on the patient support apparatus.

In another embodiment, a patient support apparatus 1200, for example a hospital bed, is shown in FIG. 12. The patient support apparatus 1200 includes an inflatable support structure 1212, inflated by a variable output pump 1214, and a controller 1216 that controls operation of the pump 1214 to inflate the structure 1212. The inflatable support structure 1212 and variable output pump 1214 are similar in structure and functionality to the inflatable support structure 112 and pump 114 shown in FIG. 1. It should be understood that a valve or manifold structure may be positioned between the pump 1214 and structure 1212 to open and close a flow path between the pump 1214 and structure 1212. For example, a valve may be used to prevent back flow from the structure 1212 through the pump 1214 when the pump 1214 is not operating.

The pump 1214 communicates pressurized air to the structure 1212 through a conduit 1232 from an outlet 1228 of the pump 1214 to an inlet 1230 of the structure 1212. In the illustrative embodiment pump 1214 is a variable displacement diaphragm pump with an AC driver 1226 which drives the diaphragm to compress air communicated through the conduit 1232. In the illustrative embodiment, the AC driver 1226 is a linear motor. The AC driver 1226 is in communication with a drive circuit 1224 of the controller 1216 with the drive circuit 1224 providing power for the operation of the driver 1226.

In the embodiment shown in FIG. 12, the drive circuit 1224 receives a direct current (DC) power signal 1210 from a DC power supply 1240. In some embodiments, the DC power supply 1240 is in electrical communication with an AC mains supply (not shown). In those embodiments, the DC power supply 1240 receives an AC power signal from the AC mains supply and converts the AC power signal into DC power signal 1210 having a fixed frequency and a fixed duty cycle. It should be understood that any suitable structure for converting an AC power signal to a DC power signal are within the scope of this disclosure. For example, one of ordinary skill would understand that a transformer or other circuitry may be utilized to convert an AC power signal to a DC power signal.

The controller 1216 includes a pressure sensor 1222 that provides a signal indicative of the pressure of the fluid in the inflatable structure 1212 to a processor 1218. In the embodiment shown in FIG. 12, the pressure sensor 1222 is in fluid communication with the inflatable support structure 1212 by a conduit 1234, which is connected to the sensor 1222 at an inlet 1238 and to the inflatable support structure at an outlet 1236. A memory device 1220 is included in the controller 1216 to store information and instructions to be used by the processor 1218. In one embodiment, the memory device 1220 includes instructions to determine an optimal drive rate based on a suitable low-flow pressure algorithm similar to the one utilized in the patient support apparatus 100 shown in FIG. 1. When executed by the processor 1218 shown in FIG. 12, instructions stored in a non-transitory storage medium, such as the memory device 1220, cause the processor 1218 to receive a signal indicative of the pressure of the fluid in the inflatable structure 1212 from the sensor 1222. Utilizing a low-flow pressure algorithm, the processor 1218 determines an optimal drive rate for the pump 1214. Based on the optimal drive rate, the drive circuit 1224 adjusts the amplitude of a drive signal and provides the amplitude adjusted drive signal 1260 to the driver 1226 for variable operation of the pump 1214. In this embodiment, the drive signal has a fixed duty and frequency.

It is to be understood that various embodiments of the sensor 1222 may be utilized within the scope of this disclosure to provide a signal to the processor 1218. For example, the sensor 1222 shown in FIG. 12 may be a flow meter that provides the processor 1218 with a signal indicative of the volumetric flow of the fluid from the pump 1214. It is contemplated that any sensor appropriate for measuring a characteristic associated with the pressure of the fluid in the inflatable structure may be utilized within the scope of this disclosure.

Figure 13:
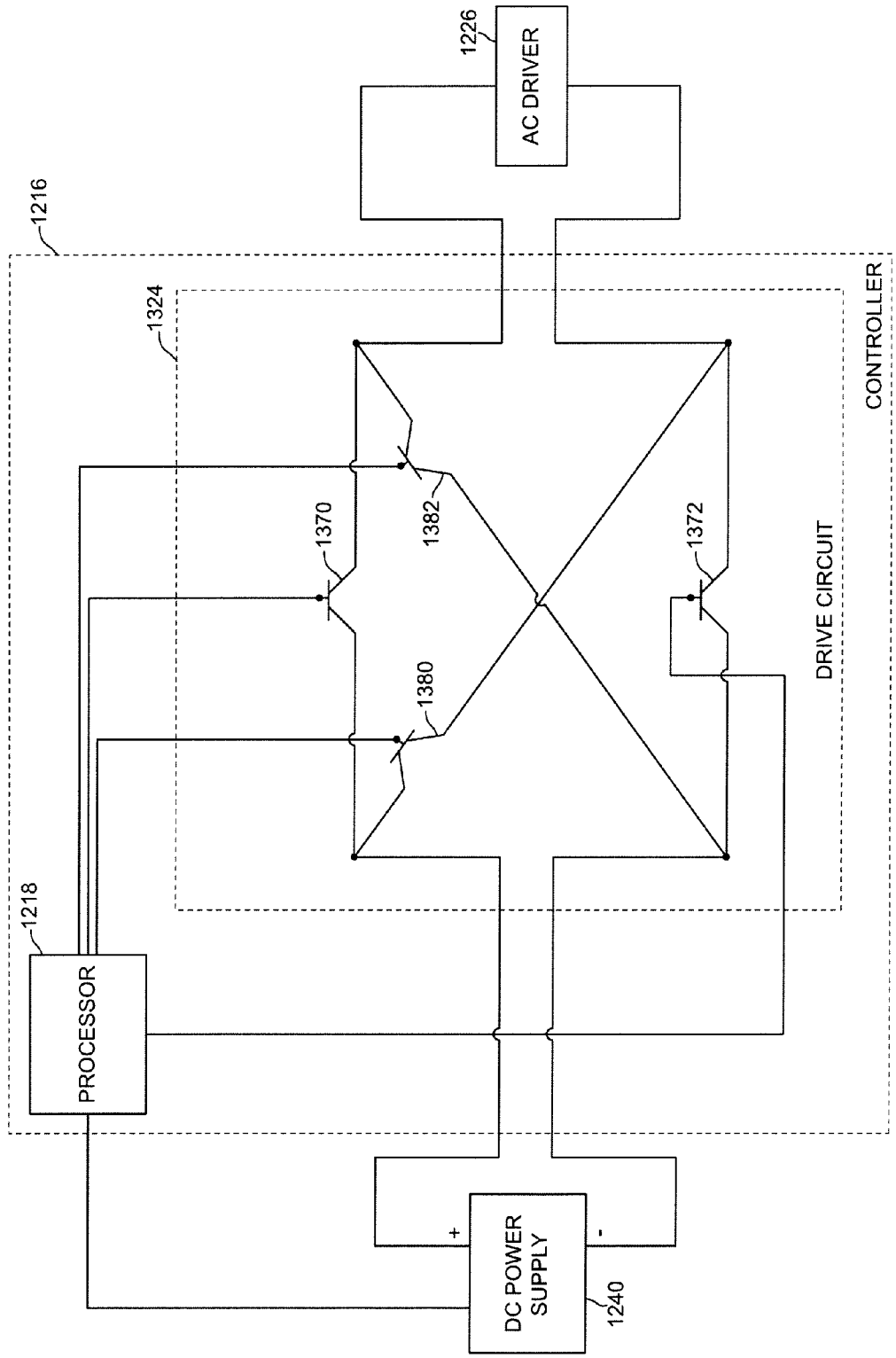
FIG. 13 is a diagrammatic representation of a controller including a circuit for adjusting a drive rate of an AC pump.

The controller 1216 shown in FIG. 13 includes a drive circuit 1324. The drive circuit 1324 is similar to the drive circuit 1224 shown in FIG. 12. Like the drive circuit 1224, the drive circuit 1324 is in communication with the AC driver 1226 and provides an amplitude adjusted drive signal 1260 to the AC driver 1226 to vary the drive rate of the pump 1214. As shown in FIG. 13, the drive circuit 1324 includes four field effect transistors (FETs) 1370, 1372, 1380, 1382 which receive the DC power signal 1210 from the DC power supply 1240. The FETs 1370, 1372, 1380, and 1382 are controlled by controls signals generated by the processor 1218. The control signals cause the FETs to act in either an open or close state. As will be understood by one of skill in the art, the terms "open state" and "closed state" describe the switching characteristics of FETs when used in this manner.

In the embodiment shown in FIG. 13, the processor 1218 controls the state of the FETs 1370, 1372, 1382, 1382 and, therefore, the direction of current of the DC power signal 1210. Thus, due to the cooperation between the processor 1218 and the FETs 1370, 1372, 1380, 1382, the DC power signal 1210 can be utilized in connection with the AC driver 1226. For example, in this embodiment, the processor 1218 closes a first pair of FETs 1370, 1372 while allowing a second pair of FETs 1380, 1382 to remain open. Subsequently, the processor 1218 then closes the second pair of FETs 1380, 1382 while allowing the first pair of FETs 1370, 1372 to remain open. The net effect is that the current flow of DC power signal 1210 is provided to the AC driver in alternating directions.

It is to be understood that various embodiments of the FETs 1370, 1372, 1380, 1382 may be utilized within the scope of this disclosure. For example, any suitable structure for switching the current flow of a DC power signal may be utilized. For example, electrical switches, mechanical switches, or any other appropriate circuitry maybe utilized within the scope of this disclosure.

As illustratively shown in FIG. 12, the processor 1218 is also in communication with the DC power supply 1240. The processor 1218 utilizes instructions stored in the memory 1220, which cause the processor 1218 to determine an optimal drive rate for operation of the pump 1214. If a drive rate adjustment is necessary, the processor 1218 transmits controls signals instructing the DC power supply 1240 to increase or decrease the voltage of the DC signal 1210 being provided to a level appropriate to achieve the optimal drive rate. In this embodiment, adjusting the voltage of the DC signal 1210 results in an amplitude adjusted drive signal 1260 having the same frequency and duty cycle.

Although the invention has been described with reference to the preferred embodiments, variations and modifications exist within the scope and spirit of the invention as described and defined in the following claims.

The invention claimed is:

1. A patient-support apparatus comprising:
   an inflatable support structure;
   a variable output pump in fluid communication with the inflatable support structure, the variable output pump including an alternating current driver configured to vary the flow of fluid provided to the inflatable support structure by the variable output pump;

a drive circuit configured to provide a direct current power signal to the alternating current driver, wherein the drive circuit alternates a current flow of the direct current power signal prior to providing the direct current power signal to the alternating current driver;

a power supply configured to provide a direct current power signal to the drive circuit;

a processor coupled to the power supply and the drive circuit, wherein the processor is configured to control the current flow provided by the drive circuit, wherein the processor is further configured to control an amount of voltage provided by the power supply to the drive circuit, and the drive circuit is configurable to maintain a substantially similar duty cycle before and after an adjustment in the amount of voltage of the direct current power signal provided by the power supply.

2. The patient-support apparatus of claim 1, further comprising:

a sensor that is in fluid communication with the inflatable support structure, the sensor operable to detect a pressure in the inflatable support structure and provide an electrical signal indicative of the pressure in the inflatable support structure, and wherein the processor controls the amount of voltage provided by the power supply in response to the pressure signal.

3. The patient-support apparatus of claim 2, wherein the drive circuit includes a first pair of transistors configured to provide the direct current power signal to the alternating current driver in a first direction of current flow and a second pair of transistors configured to provide the direct current power signal to the alternating current driver in a second direction of current flow.

4. The patient-support apparatus of claim 3, wherein the processor provides a control signal to the first pair of transistors to enable current flow in the first direction.

5. The patient-support apparatus of claim 4, wherein the processor provides the control signal to the second pair of transistors to enable current flow in the second direction.

* * * * *